Oct. 21, 1941.   W. R. FREEMAN   2,259,810
CLUTCH AND BRAKE CONTROL MECHANISM
Filed Aug. 26, 1940   2 Sheets—Sheet 1
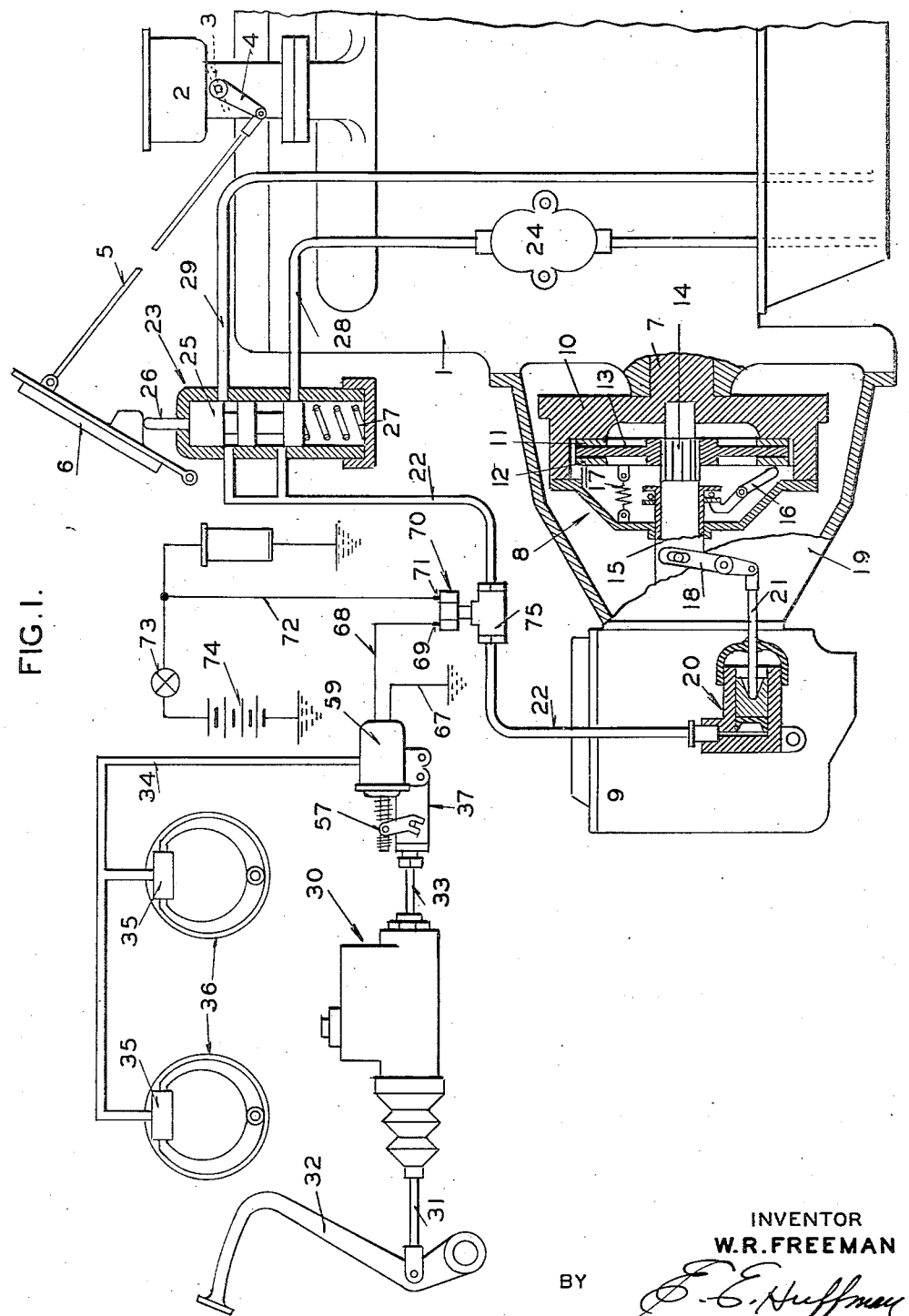
FIG.I.
INVENTOR
W.R. FREEMAN
BY
*E. E. Huffman*
ATTORNEY Oct. 21, 1941.  W. R. FREEMAN  2,259,810
CLUTCH AND BRAKE CONTROL MECHANISM
Filed Aug. 26, 1940  2 Sheets-Sheet 2

INVENTOR
W. R. FREEMAN
BY
E. E. Huffman
ATTORNEY

Patented Oct. 21, 1941

2,259,810

UNITED STATES PATENT OFFICE 2,259,810

CLUTCH AND BRAKE CONTROL MECHANISM

Walter R. Freeman, Clayton, Mo., assignor to Wagner Electric Corporation, St. Louis, Mo., a corporation of Delaware Application August 26, 1940, Serial No. 354,165

6 Claims. (Cl. 192—.01)

My invention relates to brakes and more particularly to means for maintaining the brakes applied under certain conditions and without manual effort on the brake control member.

One of the objects of my invention is to provide a brake holding means for a vehicle which can be caused to be inoperative by a fluid pressure actuating system when the fluid therein is under an operating pressure and caused to be operative when the pressure of the fluid in said system is decreased or released.

A more specific object of my invention is to provide brake holding means for a vehicle which is equipped with a clutch control system wherein the clutch is held engaged by fluid under pressure and disengaged by springs upon release of the fluid pressure and to so control said holding means that it will be operative only when the clutch is disengaged.

Figure 3:
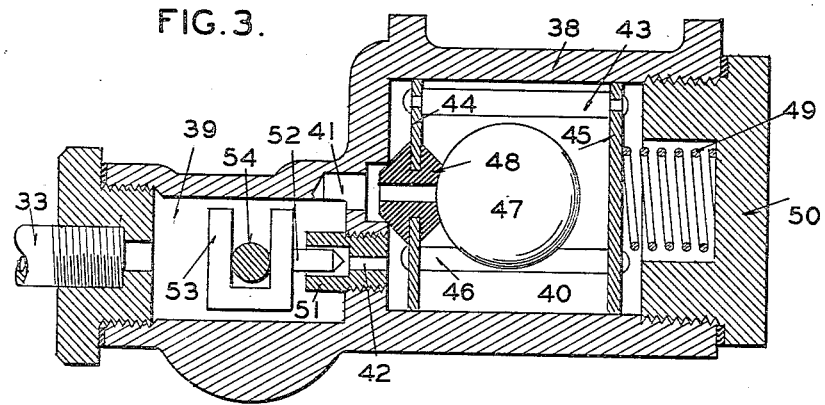
Figure 4:
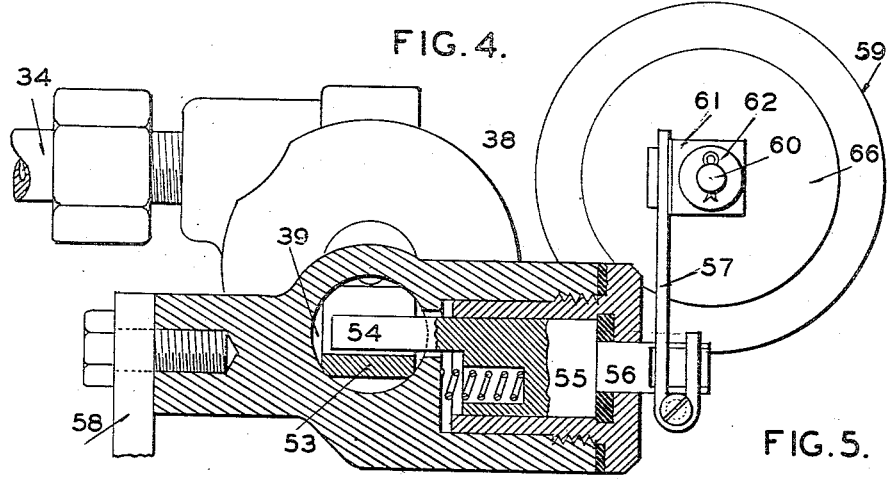
Figure 5:
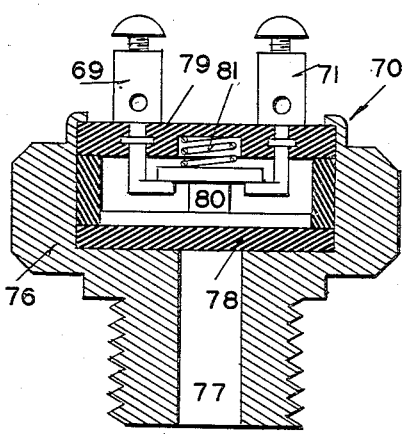
Figure 2:
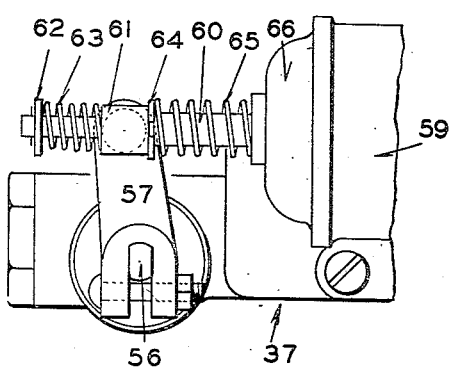

Other objects of my invention will become apparent from the following description taken in connection with the accompanying drawings in which Figure 1 is a schematic view of a braking system and a clutch control system of a vehicle having associated therewith a brake holding means in accordance with my invention; Figure 2 is an enlarged view showing the manner in which the solenoid is connected to the holding valve; Figures 3 and 4 are sectional views showing details of the brake holding valve; and Figure 5 is a view of the pressure-controlled switch associated with the fluid pressure system for the clutch.

Referring specifically to the drawings and particularly to Figure 1, the numeral 1 indicates an engine of an automobile which is provided with the usual carburetor 2 and a throttle valve 3 for varying the flow of fuel to the engine. The throttle valve is actuated by an arm 4 through a rod 5 connected to the accelerator pedal 6 mounted in the operator's compartment. The drive shaft 7 of the engine is connected through clutch 8 and change speed gearing 9 to the drive wheels of the vehicle (not shown).

The clutch shown is of the type in which springs disengage the clutch and fluid under pressure is employed to positively hold the clutch engaged. This clutch comprises a flywheel 10 driven by the engine shaft on which are mounted clutch members 11 and 12, the latter of which is capable of axial slidable movement. Interposed between members 11 and 12 is a clutch plate 13 splined to shaft 14 leading to the gearing. A clutch actuating sleeve 15 is loosely mounted on this shaft and controls arms 16 (one only being shown) for pressing the clutch member 12 toward the clutch member 11 to grip clutch plate 13 therebetween. Springs 17 (one only being shown) are employed to disengage the clutch when pressure is released from arms 16. The sleeve 15 is actuated by lever 18 pivoted to clutch housing 19 and a fluid motor 20 connected by rod 21 to said lever.

In order that the clutch may be properly controlled by the fluid motor 20, this motor is connected by conduit 22 to a control valve 23 mounted adjacent the accelerator pedal 6 in the operator's compartment. This valve controls the admission and release of fluid pressure to the fluid motor 20. The source of fluid pressure comprises a pump 24 driven by the engine and in communication with the oil in the crankcase of the engine. The movable element 25 of the valve is actuated by the accelerator pedal through plunger 26 and this element 25 is normally biased by spring 27 to such position that when the accelerator pedal is in its "off" position, the conduit 28 leading from the pump will be shut off from the conduit 22 leading from the fluid motor but conduit 22 will be connected to conduit 29 leading to the crankcase of the engine in order that any fluid under pressure in fluid motor 20 will be released. When the accelerator pedal is depressed to open the throttle valve and speed up the engine, valve element 25 will be moved downwardly so as to cut off communication between conduit 22 and the crankcase and connect the pump with said conduit 22 so that fluid under pressure can be admitted to fluid motor 20 to thereby cause the clutch to be engaged and held engaged as long as the accelerator pedal is depressed. When the accelerator pedal is again moved to its "off" position, the pump will be disconnected from fluid motor 20, said fluid motor placed in communication with the crankcase, and the clutch disengaged under the action of springs 17.

The vehicle is also provided with a braking system, the one shown being hydraulically actuated. This system comprises a master cylinder 30 for placing the fluid under pressure, the piston thereof (not shown) being actuated by a piston rod 31 and brake pedal 32 positioned in the operator's compartment. The outlet of the master cylinder is connected by conduits 33 and 34 to fluid motors 35 which actuate the brake shoes of the brake assemblies 36 (two only being shown).

In order that the brakes may be held applied under certain conditions without the necessity of maintaining the operator's foot on the brake pedal, the braking system is provided with a holding valve 37 interposed between conduits 33 and 34. As shown in detail in Figures 2, 3 and 4, this holding valve comprises a casing 38 provided with chambers 39 and 40 connected by passages 41 and 42. The chamber 39 is connected to conduit 33 leading from the master cylinder and chamber 40 is connected with the conduit 34 leading to the braking assemblies.

A cage 43 is positioned in chamber 40 and comprises end plates 44 and 45 and connecting rods 46, the lower two of which form a track for a gravity and inertia controlled ball 47. The plate 44 which lies adjacent the passage 41 carries an annular rubber seat 48 normally pressed against the end of the passage by a spring 49 interposed between the end plate 45 and a closure plug 50. By means of this construction the passage 41 will be controlled by ball 47. When the ball engages the annular valve element 48, fluid will be prevented from passing from the chamber 40 to chamber 39 but not in the opposite direction since fluid under pressure can force the ball off the seat. When the ball is disengaged from the seat, fluid under pressure can flow in both directions through passage 41.

The passage 42 between chambers 39 and 40 has associated therewith a valve seat 51 and cooperating therewith is a needle valve element 52 carried by a U-shaped block 53 slidably mounted in chamber 39. This block receives an eccentric portion 54 of shaft 55 journaled in the valve casing and provided with a concentric portion 56 extending to the outside of the casing to which is secured an arm 57.

The casing of the holding valve is secured to a bracket 58 and is so positioned on the bracket that the track for the ball will be inclined forwardly and upwardly at a slight angle (less than 4 degrees) to the horizontal when the vehicle is on a horizontal roadway. This will cause the ball to engage the valve element 48 under the action of gravity whenever the vehicle is stopped on either a horizontal roadway or an upwardly inclined roadway. The application and release of the brakes will not be affected under these conditions unless the passage 42 is closed since with this passage open the fluid under pressure is free to flow in either direction between the master cylinder and the brake fluid motors. However, if arm 57 should be operated to close the passage 42 by seating the needle valve element 52, any fluid pressure which is in the fluid motors or which may be placed in the fluid motors will be maintained therein since fluid cannot flow back to the master cylinder through either passages 41 or 42. However, additional fluid pressure can at all times be applied to the brake by being forced through passage 41 since fluid pressure from the master cylinder will unseat ball 47. Since the passage closed by the needle valve element is very small, only a small force will need to be exerted on the needle valve to hold it closed, notwithstanding there may be exceedingly high fluid pressures in the fluid motors holding the brakes applied.

If the vehicle should be moving on a roadway and the brakes are applied, ball 47 will have no effect in maintaining passage 41 closed since under these conditions the action of inertia due to deceleration of the vehicle will maintain the ball 27 away from valve seat 48. Thus there is no danger of the brakes being held applied as long as the vehicle is moving unless the operator so desires to hold them applied by maintaining his foot on the brake pedal.

It is desirable to have the brake holding valve operable only when the clutch is disengaged and the vehicle is brought to a stop. I accomplish this with the particular fluid clutch controlling system previously described by means of structure now to be described.

The holding valve casing has mounted thereon a solenoid 59, the plunger of which (not shown) has connected thereto a rod 60 for connection with arm 57 for controlling shaft 55. The connection comprises a block 61 pivoted to the arm and slidably receiving rod 60. Between this block and a washer 62 fixed to the end of the rod is a spring 63 which normally maintains the block against a C-washer 64 also secured to rod 60 and acting as an abutment for spring 65 which is interposed between said washer and casing 66 of the solenoid. Thus, by means of the structure shown, when the solenoid is energized, rod 65 will be moved to the right, thereby compressing spring 65 and operating arm 57 to cause the eccentric portion 54 to close the needle valve. If the needle valve is closed before the plunger of the solenoid has bottomed against its stop, the spring 63 can be compressed to permit this plunger to overrun the arm and so become properly bottomed that the maximum pull will be present.

One end of the solenoid coil is connected by a conductor 67 to ground, and the other end is connected by conductor 68 to terminal 69 of pressure-controlled switch 70. The other terminal 71 of this switch is connected by a conductor 72 through the usual ignition switch 73 to one terminal of a grounded battery 74. The pressure switch 70 is controlled by the fluid pressure in conduit 22 and is associated with this conduit by means of fitting 75. The switch, shown in detail in Figure 5, comprises a casing 76 having a conduit 77 in communication with conduit 22 through fitting 75. Within the casing 76 is a diaphragm 78 closing one end of conduit 77 and being subject to the pressure in said conduit. The casing also carries terminals 69 and 71 in a suitable insulation 79. Within the chamber between this insulation and the diaphragm 78 is a movable conductor member 80 normally held in contact with the inner ends of the terminals by means of spring 81. It is thus seen that the switch will be normally held closed as long as there is no pressure effective on the diaphragm 78. However, when sufficient pressure is present in conduit 77, the conductor member 80 will be moved against spring 81 and out of contact with the ends of the two terminal members, thus opening the switch.

With the brake holding valve and the control system described and associated with the braking system and the clutch control system in the manner shown it is seen that the brake holding valve can never be made operative unless the clutch is in a disengaged condition. The clutch will always be held engaged by fluid pressure from the pump whenever the accelerator mechanism is operated to open the throttle valve. Thus, under these conditions, fluid under pressure will be present in conduit 22 and this fluid pressure will cause switch 70 to be held open. As long as this switch is open, the solenoid 59 will be deenergized and needle valve 52 will be unseated by the action of spring 65. As before mentioned, with the needle valve unseated, it is impossible to maintain the brakes applied by the holding valve and, therefore, the braking system will operate in the same manner as if the holding valve were not associated with the braking system.

Whenever the accelerator pedal is moved to "off" position (idling condition of the engine), the valve 23 for controlling the clutch will be moved to such position as to disconnect the pump from fluid motor 20 and place this fluid motor in communication with the oil supply. This will result in disengagement of the clutch. The release of fluid pressure in conduit 22 will permit switch 70 to be closed under the action of spring 81, thereby energizing solenoid 59. With the energization of the solenoid the needle valve 52 will be closed.

If the vehicle should now be brought to a stop either on a level roadway or on an upwardly inclined roadway, ball 47, under the action of gravity, will engage the valve element 48. If the brakes have been applied, they will be maintained in such condition without pressure on the brake pedal since the fluid pressure in the brake actuating fluid motors will be trapped. If they have not been applied, the brakes are permitted to be applied by the unseating of ball 47. The applied pressure will be maintained as a result of the seating of the ball after fluid under pressure has been transmitted past the ball. If the vehicle is not stopped and the accelerator pedal is released and the clutch disengaged, the holding valve will not be effective since under these conditions the action of inertia due to deceleration of the vehicle will cause the ball 47 to be maintained off the valve element 48 and passage 41 opened so that fluid can flow therethrough in either direction.

Under conditions where the vehicle is stopped and the brakes held applied, they will always be automatically released whenever the vehicle is again started. By depressing the accelerated pedal to speed up the engine, fluid under pressure becomes effective in the conduit 22 and fluid motor 20 to engage the clutch. This same fluid pressure will open switch 70 and deenergize the solenoid. The spring 65 is now effective to move needle valve 52 off its seat and open the passage 42, thereby permitting the fluid which has been trapped in the brake fluid motors to flow back to the master cylinder, thus releasing the brakes.

Being aware of the possibility of modifications in the particular structure herein described without departing from the fundamental principles of my invention, I do not intend that its scope be limited except as set forth by the appended claims.

Having fully described my invention, what I claim as new and desire to secure by Letters Patent of the United States is:

1. In a motor vehicle provided with braking mechanism, means associated with the braking mechanism for holding the brakes applied, a fluid pressure system comprising an operator-controlled source of pressure and a fluid motor for causing an element of the vehicle to be operative when fluid pressure is effective in the system, and means governed by the fluid pressure in said system for causing the brake holding means to be inoperative, said brake holding means being caused to be operative when the fluid pressure is decreased to cause the element it controls to be inoperative, said last named means comprising a solenoid for operating the holding means, an electrical circuit, a normally closed switch, and fluid pressure operated means for opening the switch.

2. In a motor vehicle provided with braking mechanism and with clutch mechanism, means associated with the braking mechanism for holding the brakes applied, fluid pressure-operated means including an operator-controlled source of pressure in excess of atmospheric pressure and a fluid motor for holding said clutch mechanism in clutch engaged position, means for causing said brake holding means to be inoperative by the fluid pressure in the clutch operating means when the clutch is being held engaged, said means comprising a solenoid for operating said holding means, an electrical circuit, a normally closed switch, and fluid pressure-operated means for opening the switch.

3. In a motor vehicle provided a spring released clutch and a fluid pressure braking system, valve means for holding the brake applied, a fluid pressure system for holding the clutch engaged and comprising a clutch operating means, a source of pressure and a control valve, a solenoid for moving the brake holding valve means to a holding position, a circuit including a normally closed switch, and a fluid motor operable by the fluid pressure employed to hold the clutch engaged for holding the switch open.

4. In a motor vehicle provided with an accelerator mechanism, a spring released clutch and a fluid pressure braking system, valve means for holding the brakes applied, a fluid pressure system for holding the clutch engaged and comprising a clutch operating motor, a source of pressure and a valve controlled by the accelerator mechanism, said valve permitting fluid pressure from the source to engage the clutch when the accelerator mechanism is in an operative position and permitting disengagement of the clutch when the accelerator mechanism is in "off" position, a solenoid for moving the brake holding valve means to a holding position, a circuit including a normally closed switch, and a fluid motor operable by the fluid pressure employed to hold the clutch engaged for holding the switch open.

5. In a motor vehicle provided with a fluid pressure braking system comprising a source of pressure and a brake actuating motor connected thereto by conduit means, valve means associated with the conduit means for maintaining fluid pressure in the motor for holding the brake applied and permitting release of pressure from the source, a member movable to two different positions for controlling movement of the vehicle, a fluid pressure system independent of the braking system for controlling said member and including a source of pressure and a motor connected thereto by conduit means for actuating said member, and means for causing said valve means to be inoperative when fluid pressure in said last named system causes said member to be moved to one position and to be operative when the fluid pressure is decreased to permit said member to be moved to the other position, said last named means comprising a fluid motor operated by the fluid pressure in the conduit means of the said last named fluid pressure system and means controlled by the last named fluid motor when operative for causing the valve means to be inoperative.

6. In a motor vehicle provided with an accelerator mechanism, with a clutch and with a fluid pressure braking system comprising a source of pressure and a brake actuating motor connected thereto by conduit means, valve means associated with the conduit means for maintaining fluid pressure in the motor for holding the brake applied and permitting release of pressure from the source, a fluid pressure system independent of the braking system for holding said clutch engaged and including a source of pressure and a motor connected thereto by conduit means for actuating said clutch, valve means in the last named conduit means, means for controlling said valve means by the accelerator mechanism so as to cause fluid pressure to be admitted to the clutch fluid motor when the accelerator mechanism is in "off" position and released therefrom when in an operative position, and means for causing said valve means to be inoperative when fluid pressure in said last named system causes said clutch to be engaged and to be operative when the fluid pressure is decreased to permit said clutch to be disengaged, said last named means comprising a fluid motor operated by the fluid pressure in the conduit means of the clutch actuating system and means controlled by the last named fluid motor when operative for causing the valve means to be inoperative.

WALTER R. FREEMAN.